(12) United States Patent
Tan et al.

(10) Patent No.: US 6,820,910 B1
(45) Date of Patent: Nov. 23, 2004

(54) TAILGATE LIFT ASSIST SYSTEM

(75) Inventors: Kian-Huat Tan, Westland, MI (US);
Nelson Roos, Canton, MI (US); James Rice, Brighton, MI (US); David Qu, Canton, MI (US); Thomas Peddicord, III, Charlottesville, VA (US); Cindy Kreitsch, Taylor, MI (US); Angela Reed, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/686,452

(22) Filed: Oct. 16, 2003

(51) Int. Cl.$^7$ .............................................. B62D 33/03
(52) U.S. Cl. .................... 296/57.1; 296/106; 49/386
(58) Field of Search ................................ 296/57.1, 106; 49/386

(56) References Cited

U.S. PATENT DOCUMENTS

| | | | | |
|---|---|---|---|---|
| 3,009,732 A | * | 11/1961 | Brown | 296/57.1 |
| 5,234,249 A | * | 8/1993 | Dorrell | 296/180.1 |
| 5,358,301 A | | 10/1994 | Konchan et al. | |
| D370,453 S | * | 6/1996 | Shortman et al. | D12/223 |
| 5,769,593 A | * | 6/1998 | Buffaloe | 414/537 |
| 5,988,724 A | | 11/1999 | Wolda | |
| 6,196,609 B1 | * | 3/2001 | Bowers | 296/57.1 |
| 6,267,429 B1 | | 7/2001 | Kuzmich et al. | |
| 6,341,809 B1 | | 1/2002 | Chapman | |
| 6,364,391 B1 | | 4/2002 | Everett | |
| 6,378,927 B1 | | 4/2002 | Parry-Jones et al. | |
| 6,427,888 B1 | | 8/2002 | Condon et al. | |
| 6,435,594 B1 | | 8/2002 | Ekonen et al. | |
| 6,467,417 B1 | | 10/2002 | Guyot et al. | |
| 6,470,729 B1 | | 10/2002 | Hughes et al. | |
| 6,471,277 B1 | | 10/2002 | Scensny et al. | |
| 6,481,604 B1 | | 11/2002 | Beene et al. | |
| 6,494,520 B2 | | 12/2002 | Brzenchek et al. | |

OTHER PUBLICATIONS

Back Saver Tailgate Assist * Product Info, May 2, 2003, http://thebacksaver.com/product.htm.

* cited by examiner

Primary Examiner—Dennis H. Pedder
(74) Attorney, Agent, or Firm—Gigette M. Bejin (57) ABSTRACT

The invention provides a tailgate lift assist system and associated methods and apparatus that provide controlled force at various points as a tailgate is pivoted between open and closed position to assist the operator in both opening and closing the tailgate. The system is suitable for commercial mass production, and is preferably suitable for customer, dealer, or OEM installation.

30 Claims, 10 Drawing Sheets

At Full Open Position

TAILGATE LIFT ASSIST SYSTEM

BACKGROUND OF THE INVENTION

The invention relates generally to pick up truck tailgates, and more particularly to a method and apparatus to provide tailgate lift assist.

A pickup truck tailgate must be capable of constraining cargo in the pickup truck box, providing structure to the box, and in some cases supporting the weight of materials extending beyond the box when the tailgate is open. As a result, the weight of a typical tailgate is substantial. For example, the tailgate of a fill size pickup truck may weigh about 55 tbs.

In addition to the loads ass ociated with constraining and supporting cargo, the tailgate must be capable of withstanding impact loads associated with many thousands of cycles of opening and closing. These loads may be quite significant, particularly those associated with dropping or slamming a heavy tailgate into open position. Cables extending from the D posts to the left and right ends of the tailgate are often employed to support the tailgate in open position. These cables must have sufficient strength and durability to withstand many cycles of dropping or slamming the tailgate into open position.

The weight associated with a tailgate may make the tailgate difficult for some persons to operate, in that the amount of force that must be applied to initiate closing of the tailgate by lifling it from its fully open position is largely dependent on its weight. Similarly, the amount of force required to support the tailgate to prevent it from slamming as it is being lowered into fully open position is dependent on its weight.

The need for a pra ctical and economical tailgate lift assist system for pickup trucks has long been recognized. Ideally, such a system would be suitable for both OEM installation and retrofit installation by dealers and customers, and would facilitate both open ing and closing without adding unacceptable weight and without unduly complicating removal and replacement of the tailgate. Such a system would also be lightweight and capable of economical mass production.

Various proposals have been made over the years to provide tailgate lift assist. U.S. Pat. No. 5,358,301 describes a system that employs a torsion rod mounted within the tailgate. The system is somewhat complicated, and it is believed that the system described in this patent would be difficult to install.

SUMMARY OF THE INVENTION

The in vention provi des a tailgate lift assist system and associated me thods and apparatus that provide controlled force at various points as a tailgate is pivoted between open and closed position to assist the operator in both opening and closing the tailgate, and that may be installed without undue difficulty. The system is suitable for commercial mass production, and is preferably suitable for customer, dealer, or OEM installation.

The system includes a tensioning mechanism that preferably comprises one or more springs, bungee cords or other resilient members, and may comprise a plurality of resilient members having different spring constants or stiffness, to provide predetermined levels of assist at various points in opening and closing of the tailgate. In the preferred embodiment, the tensioning mechanism comprises a pair of coil springs in series loaded in tension and extending across the tailgate, and a noise-reducing sheath at least partially covering the coil springs. In other embodiments, the tensioning mechanism may be positioned in other orientations, e.g., diagonally or vertically.

The tensioning mechanism preferably transmits tension between supports, or support members, such as cables, cords, chains or the like to equalize tension in the support members. The tensioning mechanism preferably has two connection points, one for each of two support members on opposite ends of the tailgate, and is configured to provide equal tension to each support member. This may be accomplished by permitting the tensioning mechanism to move in the direction of greater tension in response to any transitory inequality in tension.

During closing, the tensioning mechanism preferably retracts portions of the supports into the interior of the tailgate as the tailgate is pivoted upward, and decreases tension on the supports, thereby decreasing upward assist, as the tailgate is pivoted upward from its fully open position. During opening, the sequence is reversed, with the tensioning mechanism permitting withdrawal of the support members from the tailgate and increasing tension as the tailgate approaches fully open position. During opening, the support tension increases the potential energy of the tensioning mechanism, and during closing, the upward pivoting of the tailgate decreases potential energy.

The support members preferably extend into the interior of the tailgate through openings in the lateral ends of the tailgate. To reduce wear and possible damage due to impacts, reinforcing structures may be mounted on the tailgate walls adjacent the openings to increase the ability of the tailgate. The reinforcing structures may include one or more rollers for engaging the support members in rolling contact instead of sliding contact.

To enable the support members to limit downward pivoting of the tailgate, limiters may be provided on the support members inside the tailgate. Each of the limiters may comprise one or more clamps attaching it to one of the support members, and a resilient, energy absorbing bumper to absorb energy upon impact with one of the reinforcing structures. The bumpers may be made of an elastomeric material.

Installing of a tensioning mechanism often requires provision of a means for maintaining tension on a spring or the like during the installation process, which can increase the time and expense associated with installation. To avoid this problem, the system preferably applies tension to the support members only through a predetermined range of tailgate angles, so that the system may be installed or removed without significant tension on the tensioning mechanism or the support members. That is, when the tailgate is within a certain range of angles, the system is under only minimal tension, such as tension associated with friction and the weight of the support members, and possibly the weight of the tensioning mechanism, which may be regarded as zero tension for purposes of discussion herein.

In the embodiments described in detail below and for which data is presented in the attached drawings, the system applies significant tension to the support members at least when the tailgate is at an angle of between 40 and 90 degrees from its closed position, and the system does not apply significant tension to the support members at least when the tailgate is at an angle of between 0 and 20 degrees from its closed position.

To enable loads to be carried on the tailgate when it is open, e.g., loads associated with elongated items extending beyond the truck bed, without the tailgate pivoting or bouncing upward excessively, the maximum assist provided by the system is preferably well below the minimum force required to initiate upward pivoting under static conditions. For example, in the preferred embodiment, under static conditions, an upward load of at least 10 lbs. in excess of the assist provided by the system must be applied to the tailgate to initiate upward movement from its fully open position.

In the preferred embodiment, the support members are detachably connected to the support members of the pickup truck by small brackets or fittings or the like, held in place by removable and replaceable fasteners such as screws or bolts, and the system does not interfere with removal of the tailgate from the pickup truck after detachment of the support members.

The system is preferably configured so that it does not have any components protruding or visible when the tailgate is closed, When the tailgate is open, its components project only minimally from the tailgate so as to have no adverse impact on clearances or appearance.

The system may be provided as a kit for retrofit installation comprising a tensioning mechanism, new cable assemblies or other supports with limiters preinstalled thereon, reinforcing plates, and fasteners. In some embodiments, the cables may be preattached. In other embodiments, the cables may be attached as part of the installation process. In either case, the kit is preferably configured to enable installation to be accomplished with a relatively small number of steps.

A typical installation process may comprise removing the original cables from the tailgate and D posts, removing a panel from the inner wall of the tailgate, drilling holes if necessary for the new cables and/or reinforcement plates in the end walls of the tailgate, inserting the tensioning mechanism into the interior of the tailgate, installing the reinforcement plates, extending the new cables through the holes, and attaching the cables to the D posts.

DETAILED DESCRIPTION OF PREFERRED EMBODIMENTS

The invention is preferably embodied in tailgate lift assist systems that provide controlled force at various points as a tailgate is pivoted between open and closed position to assist the operator in both opening and closing the tailgate, in pickup trucks and tailgates including such systems, and in methods of operation and methods of installation of such systems.

Figure 1:
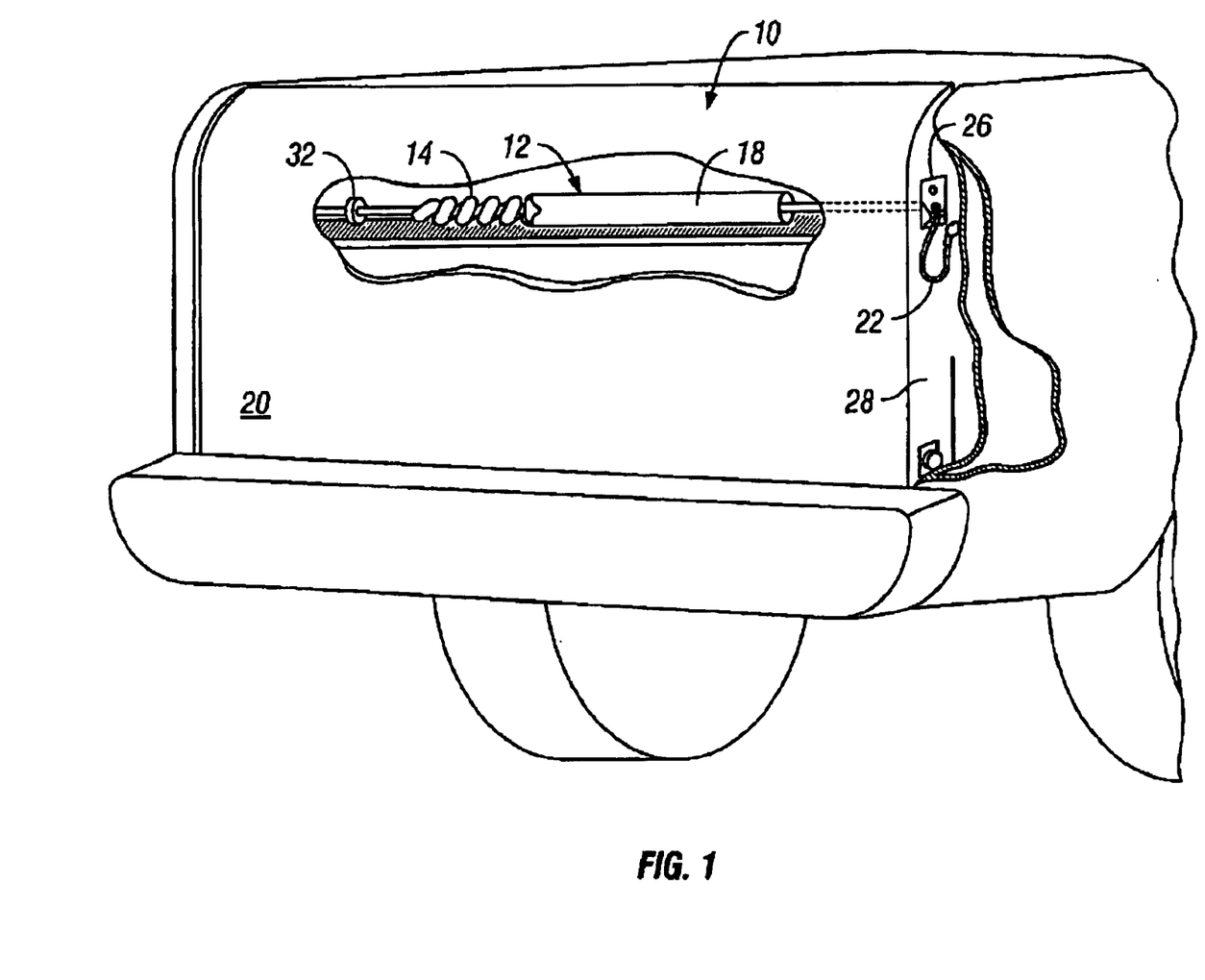
FIG. 1 is a partial perspective view of a pickup truck with portions broken away to show a system in accordance with a first embodiment of the invention.
Figure 11:
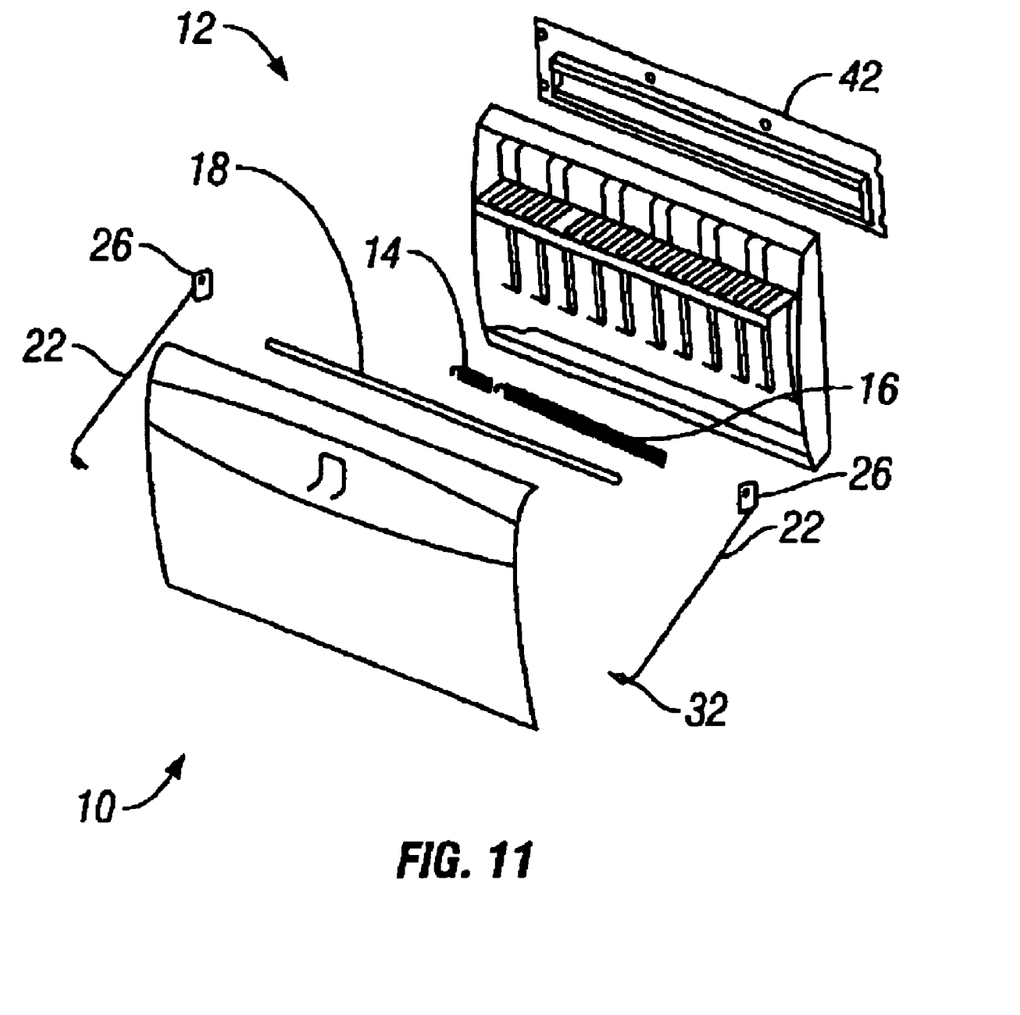
FIG. 11 is an exploded perspective view of a system in accordance with an embodiment of the invention.

In the illustrated embodiments, the system 10 includes a tensioning mechanism 12 that preferably comprises one or more mechanisms for storing and releasing potential energy such as springs loaded in compression, tension or torsion, bungee cords or other resilient members, and may comprise a plurality of resilient members having different spring constants or stiffness, to enable the mechanism to provide predetermined levels of assist at various points in opening and closing of the tailgate 20 while also enabling the system to fit within a predetermined envelope of available space. The system may rely on only a single spring as shown in FIG. 1, or may include two or more springs. In one particular embodiment, as illustrated in FIG. 11, the tensioning mechanism comprises a pair of coil springs 14 and 16 in series loaded in tension and extending horizontally across the tailgate, and a noise-reducing sheath 18 at least partially covering the coil springs. In other embodiments, the tensioning mechanism 12 may be positioned in other orientations, e.g., diagonally or vertically.

The tensioning mechanism preferably transmits tension between supports, or support members 22, such as cables, cords, chains or the like to equalize tension in the support members. That is, the tensioning mechanism preferably has two connection points, one for each of two support members on opposite ends of the tailgate, and is configured to provide equal tension to the support members. This may be accomplished by permitting the tensioning mechanism to move in the direction of greater tension in response to any minor transient inequality in tension.

During closing, the tensioning mechanism 12 preferably retracts portions of the supports 22 into the interior of the tailgate 20 as the tailgate is pivoted upward, and decreases tension on the supports, thereby decreasing upward assist, as the tailgate is pivoted upward from its fully open position. During opening, the sequence is reversed, with the tensioning mechanism permitting withdrawal of the support members from the tailgate and increasing tension as the tailgate approaches fully open position. During opening, the support tension increases the potential energy of the tensioning mechanism, and during closing, the upward pivoting of the tailgate decreases potential energy.

The tensioning mechanism 12 is preferably spaced from the hinge axis of the tailgate, and therefore its weight contributes to the moment of the tailgate that must be overcome to raise the tailgate. However, by positioning it in the upper half of the tailgate, near the points at which the cables enter, total cable length may be minimized or reduced.

Figure 2:
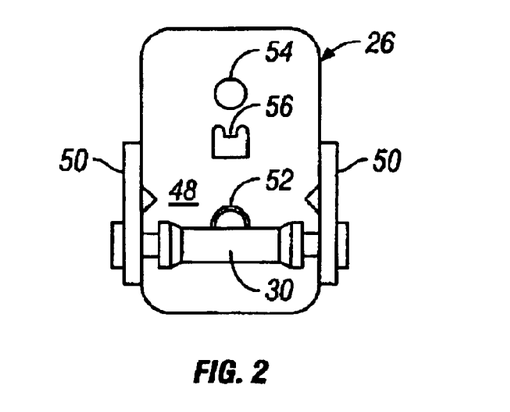
FIG. 2 is a side elevational view of a reinforcing structure in the system of FIG. 1.
Figure 3:
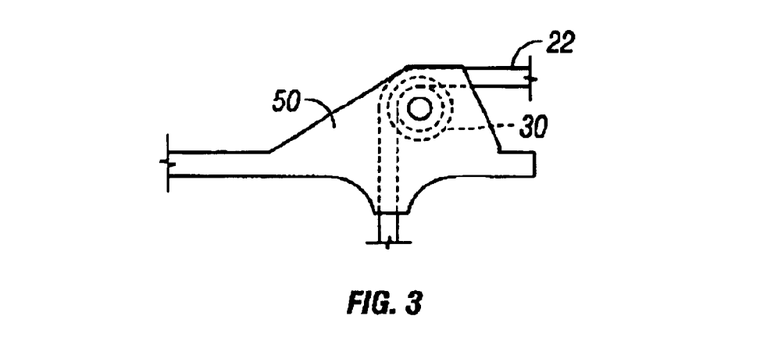
FIG. 3 is a partial front view of the reinforcing structure of FIG. 2.
Figure 4:
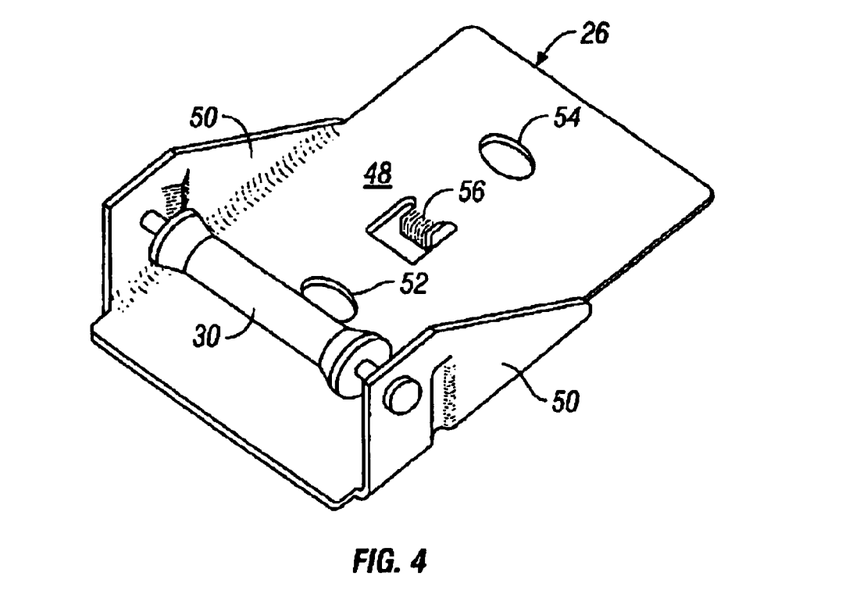
FIG. 4 is a perspective view of the reinforcing structure of FIG. 2.
Figure 5:
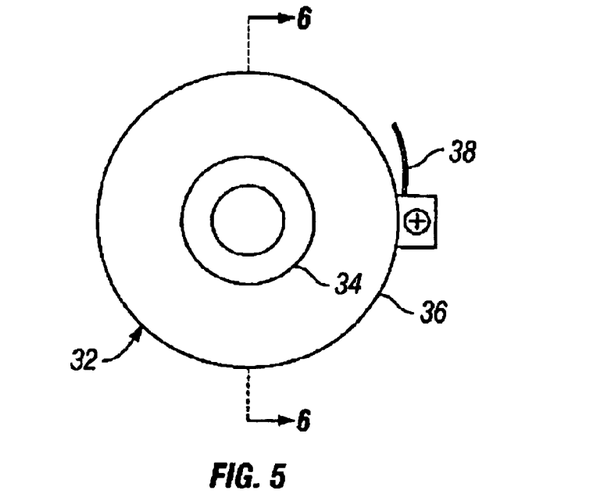
FIG. 5 is a side elevational view of a limiter in accordance with a first embodiment of the invention.
Figure 6:
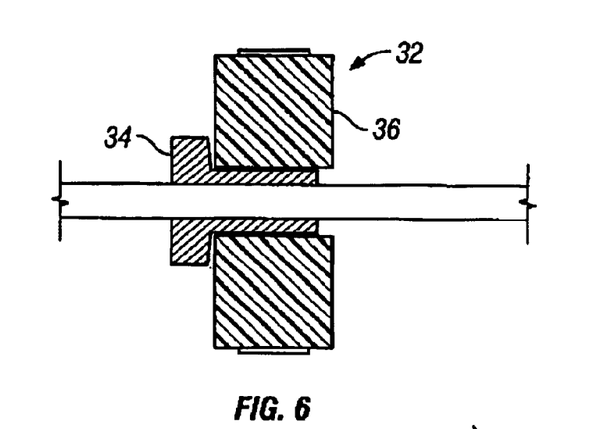
FIG. 6 is a sectional view thereof taken along lines 6—6 in FIG. 5.
Figure 7:
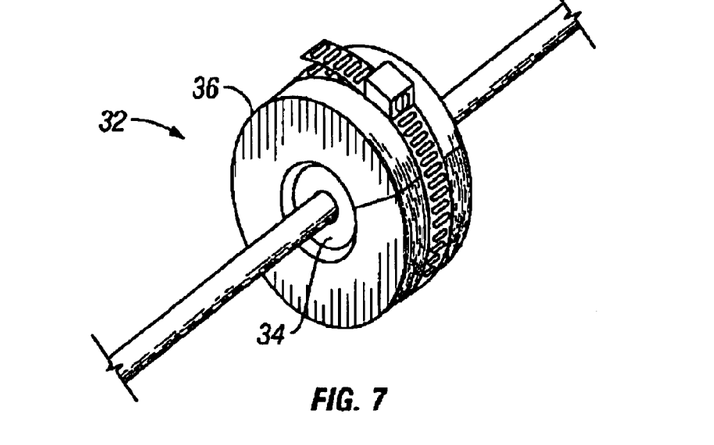
FIG. 7 is a perspective view thereof.
Figure 8:
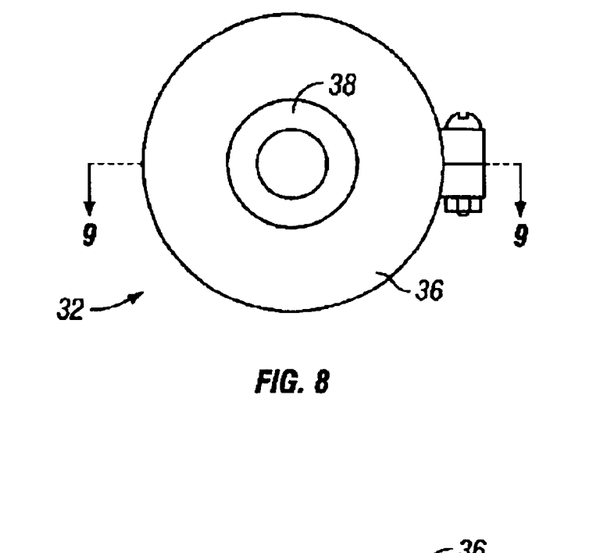
FIG. 8 is a side elevational view of a limiter in accordance with an alternate embodiment.
Figure 9:
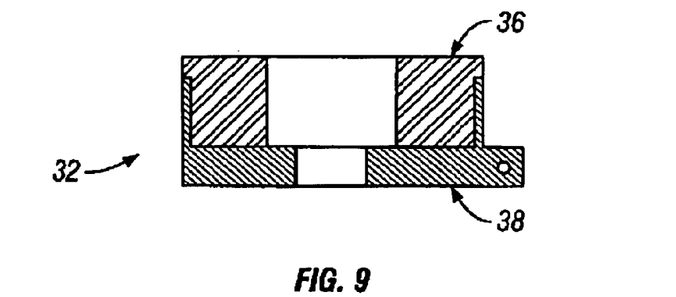
FIG. 9 is a sectional view thereof taken along lines 9—9.
Figure 10:
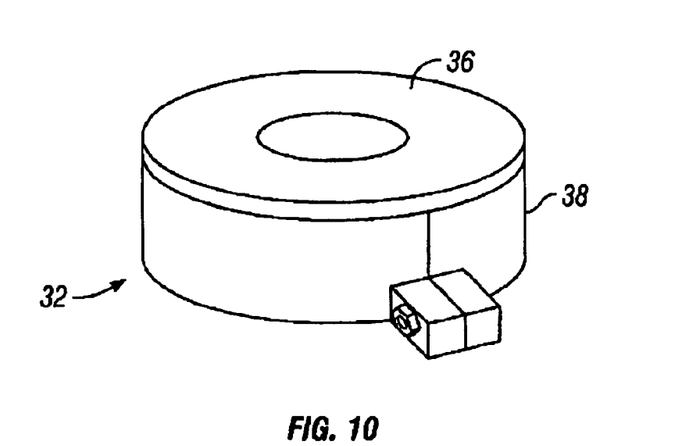
FIG. 10 is a perspective view thereof.

The support members 22 preferably extend into the interior of the tailgate through openings 24 in the lateral ends of the tailgate. To reduce wear and possible damage due to impacts, reinforcing structures 26 may be mounted on the left and right tailgate end walls 28 adjacent the openings. The reinforcing structures 26 may include one or more rollers 30 for engaging the support members in rolling contact instead of sliding contact. Each of the reinforcing structures 26 may comprise a plate having a base 48, a pair of upstanding sidewalls 50 supporting the roller 30, and an opening 52 for the support member 22. A second opening 54 may be provided for a fastener to attach the reinforcing plate to the end wall of the tailgate. A tab 56 punched out of the base plate and bent inward is preferably provided to extend into a locating hole or opening on the end wall to maintain the reinforcing structure in its proper orientation.

Figure 12:
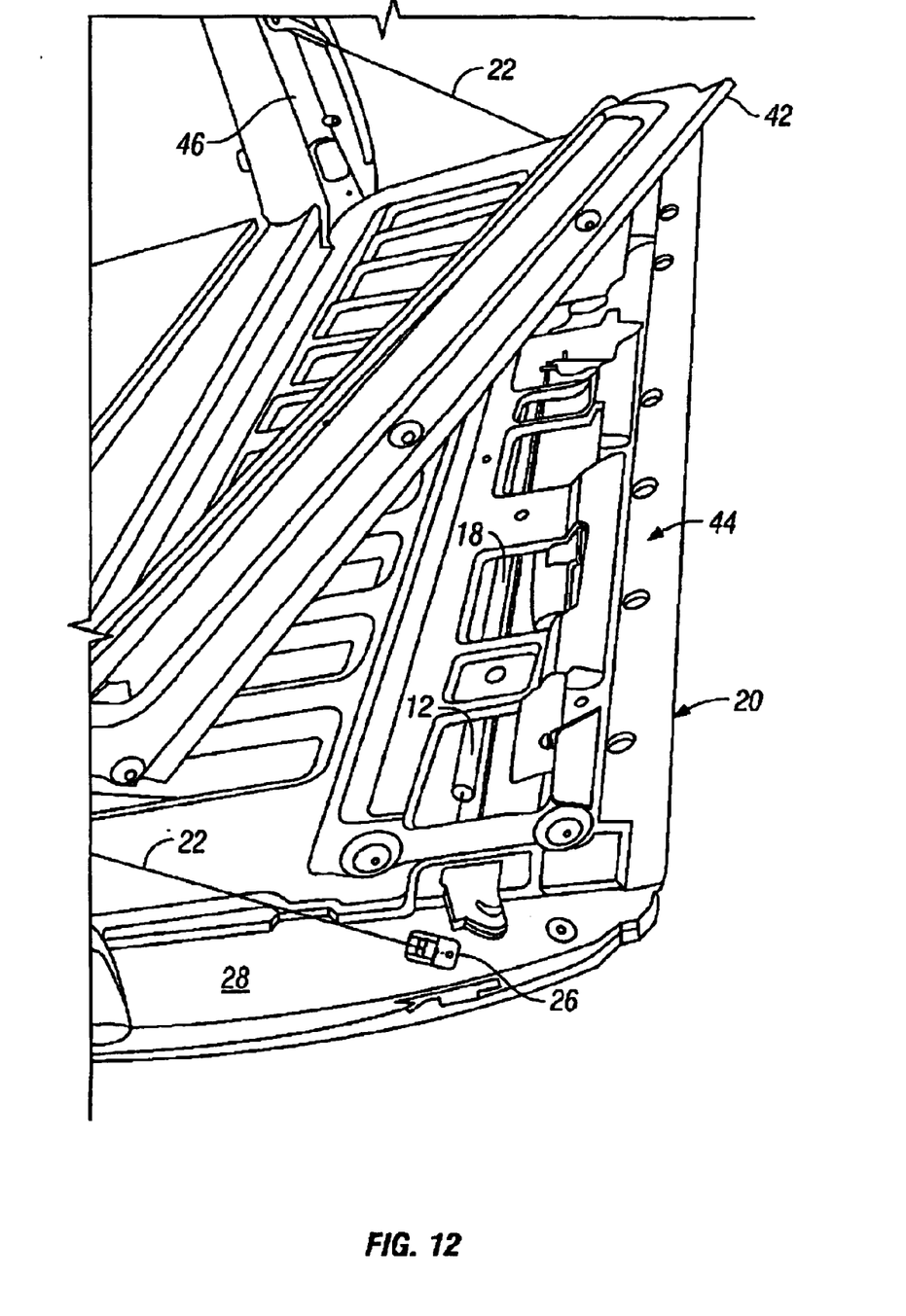
FIG. 12 is a perspective view of a tailgate during installation of a system in accordance with an embodiment of the invention.

The reinforcing structure is preferably oriented so that the roller axis is perpendicular to the support member at or near the fully open position of the tailgate, so that the support member will be substantially perpendicular to the roller while the support member is at or near its greatest tension. FIG. 12 shows the reinforcing structure of FIGS. 2–4 mounted at an angle on the end wall of the tailgate to achieve this. FIGS. 15–18 illustrate two alternatives to the embodiment of FIGS. 2–4.

Figure 15:
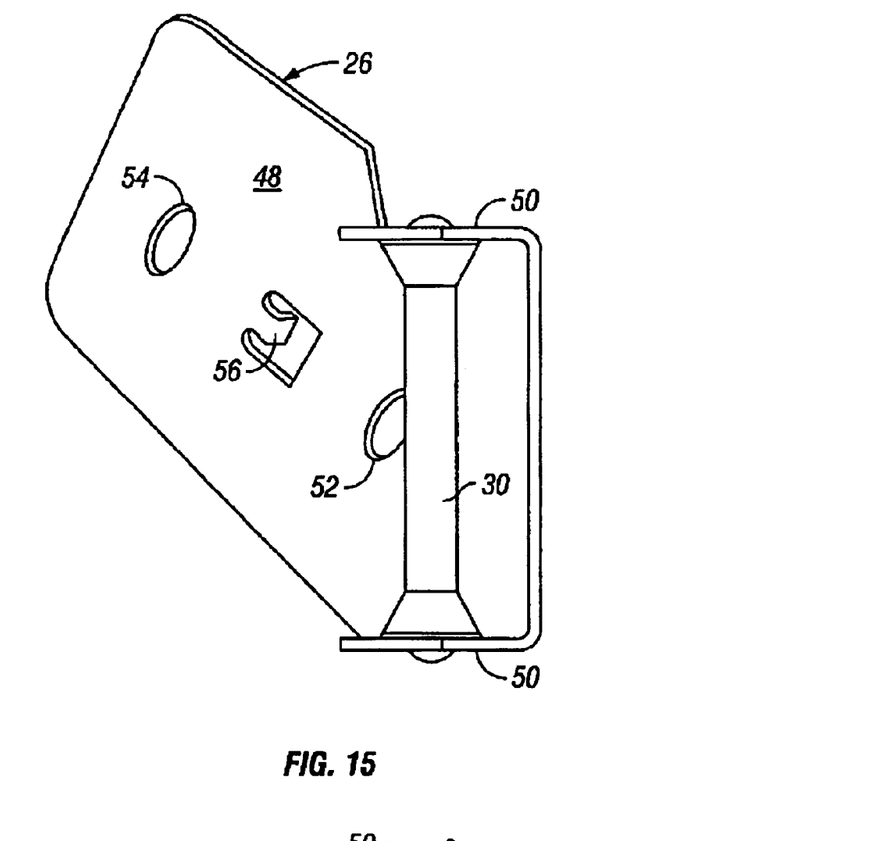
FIG. 15 is a perspective view of a reinforcing structure in accordance with an alternative to the embodiment of FIG. 2.
Figure 16:
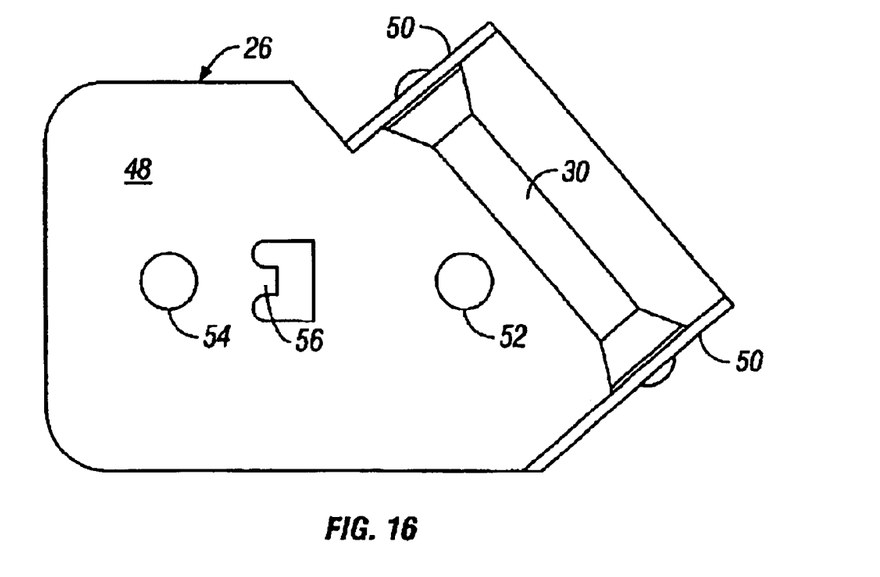
FIG. 16 is a side elevational view thereof.

FIGS. 15 and 16 illustrate a reinforcing structure for one lateral end of the tailgate comprising a single roller 30 supported by upstanding sidewalls 50 at an angle. That is, the roller and sidewalls are angled relative to aligned fastener openings 52 and 54 so that the fastener openings may be aligned with corresponding openings in the tailgate end wall with the roller 30 positioned at a non-oblique angle of, e.g., between about 20 and about 70 degrees to a line through the centers of the openings. The openings 52 and 54 may be positioned to line up with preformed mounting holes in the tailgate end walls. This may enable the reinforcing plate to replace a cable attachment plate mounted on the tailgate end wall as original equipment without requiring drilling of new mounting holes. Where this embodiment is used, a mirror image embodiment will be used on the opposite end of the tailgate.

Figure 17:
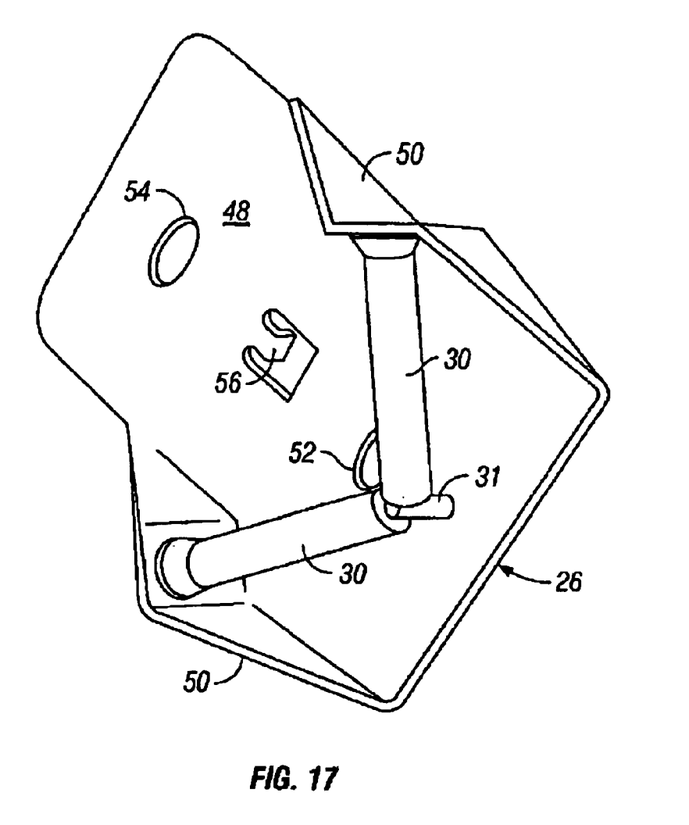
FIG. 17 is a perspective view of a reinforcing structure in accordance with another alternative to the embodiment of FIG. 2.
Figure 18:
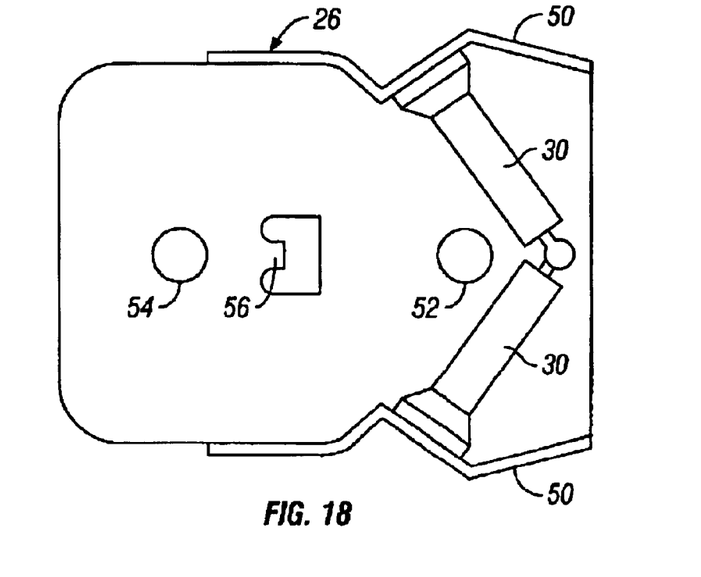
FIG. 18 is a side elevational view thereof.

FIGS. 17 and 18 illustrate an reinforcing structure having angular geometry similar to that of FIGS. 15 and 16, but with a V-shaped roller assembly comprising a pair of rollers 30 oriented symmetrically or generally symetrically about a central axis. Each roller is supported by an angled sidewall at one end, and by a central support post 31 at its opposite end. This embodiment eliminates the need for different left and right reinforcing structures.

To enable the support members 22 to limit downward pivoting of the tailgate, limiters 32 may be provided on the support members inside the tailgate. Each of the limiters may comprise a core 34 fixed to the support member by swaging, clamping, or other means, resilient, energy absorbing bumper 36 to absorb energy upon impact with one of the reinforcing structures and one or more clamps 38 for securing the bumper to the core. The bumpers may be made of an elastomeric material or other material having sufficient strength and impact resistance to arrest downward pivoting of the tailgate by engaging the interior of the reinforcing structure.

To avoid a need for maintaining tension during the installation process, which would increase the time and expense associated with installation, the system preferably applies tension to the support members only through a predetermined range of tailgate angles, so that the system may be installed or removed without significant tension on the tensioning mechanism or the support members. That is, when the tailgate is within a certain range of angles, the system is under only minimal tension, such as tension associated with friction and the weight of the support members, and possibly the weight of the tensioning mechanism, which may be regarded as equivalent to zero tension for purposes of discussion herein.

In the embodiments described in detail below and for which data is presented in the attached FIGS. 14 and 15, the system applies significant tension to the support members at least when the tailgate is at an angle of between 0 and 50 degrees from its fully open position and in the embodiment for which data is presented in FIGS. 14 and 15, at least between 0 and 60 degrees, and the system applies no tension to the support members at least when the tailgate is at an angle of between 70 and 90 degrees from its fully open position.

The effort E required to close the tailgate in the illustrated embodiment may be expressed by the following equation:

$$E = \frac{(BW\cos(90-a) - 2D_c T \sin b)}{2B}$$

Where, as shown in 13A and 13B,

B=Tailgate width

Figure 13A:
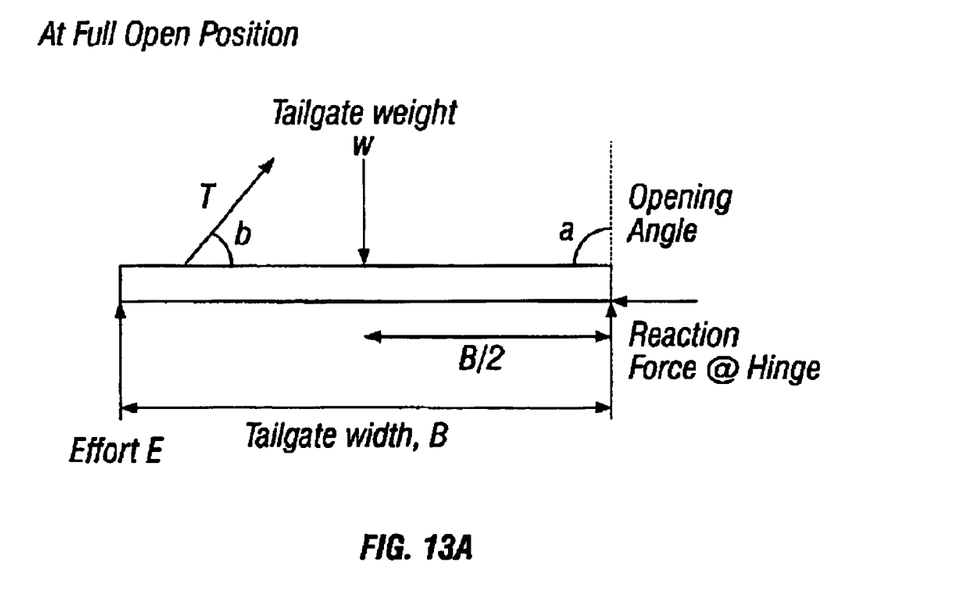
FIGS. 13A and 13B are free body diagrams of a tailgate equipped with a system in accordance with an embodiment of the invention.
Figure 13B:
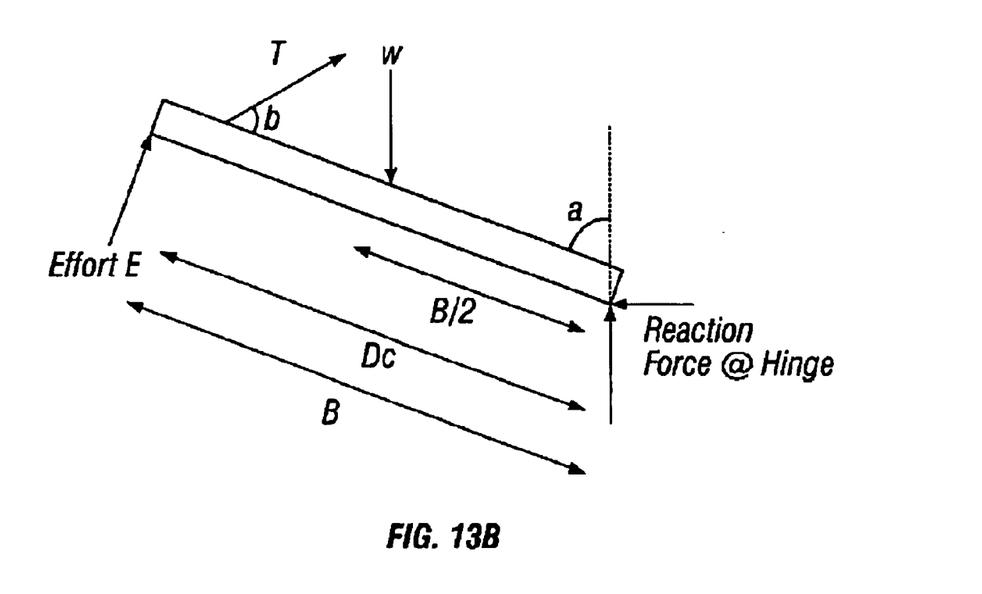

W=Tailgate weight (assumed to be evenly distributed over the tailgate area)

$D_c$=Distance between hinge axis and roller 30.

a=opening angle, with 90 degrees corresponding to fully open position and 0 degrees corresponding to closed position.

T=Cable Tension b=angle between cable and tailgate.

To enable loads to be carried on the tailgate when it is open, e.g., loads associated with elongated items extending beyond the truck bed, without the tailgate pivoting or bouncing upward excessively, the maximum assist provided by the system is preferably well below the minimum force required to initiate upward pivoting under static conditions. For example, under static conditions, it is desirable that an effort E of at least about 5 lbs. in excess of the assist provided by the system, and preferably at least 10 lbs. in excess of the assist, must be applied to the tailgate to initiate upward movement from its fully open position.

Figure 14:
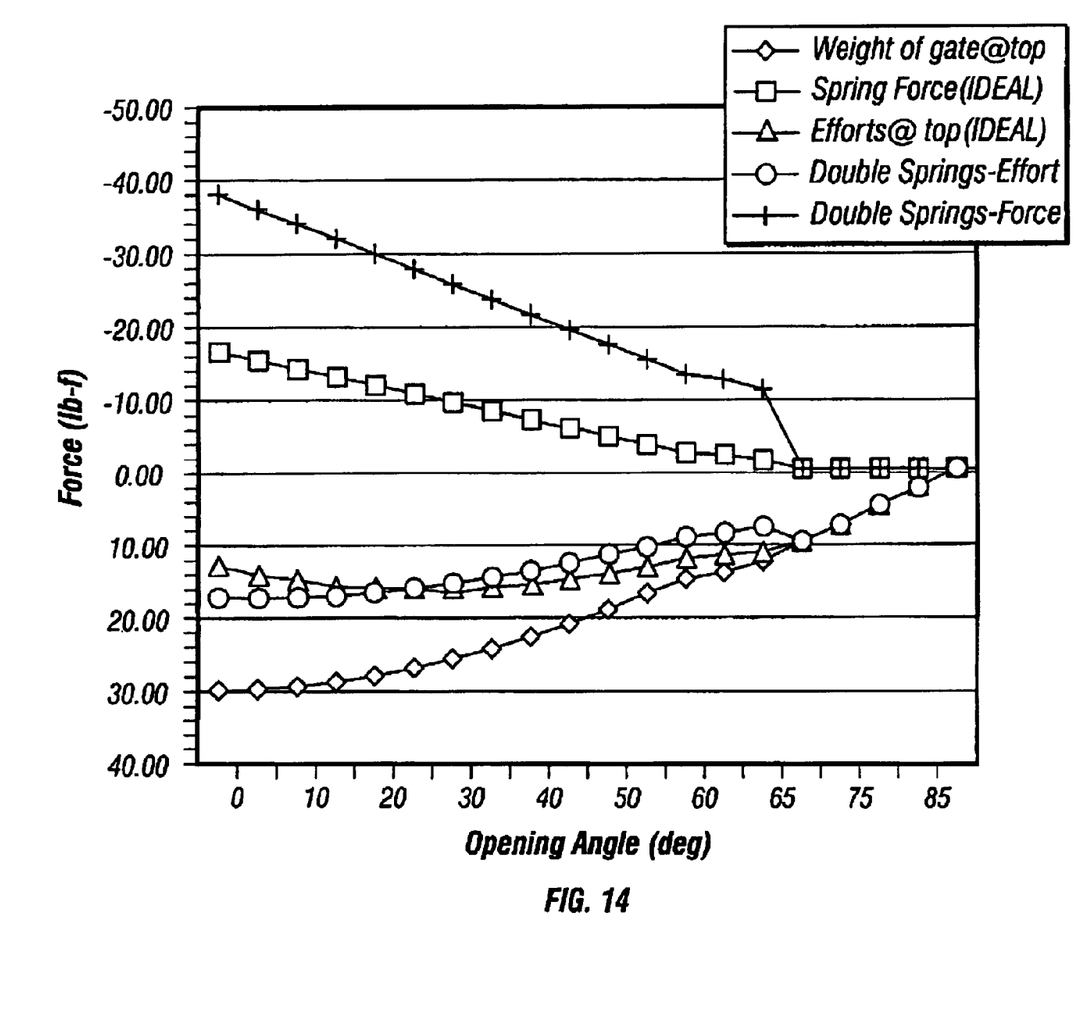
FIG. 14 is a graph illustrating force as a function of tailgate angle with respect to a variety of forces.

FIG. 14 illustrates various forces as a function of tailgate angle in accordance with a preferred embodiment of the invention. The three plots below the horizontal axis indicate operating efforts. The plot with triangular data points, labeled "Efforts @ top (IDEAL)", illustrates a desired profile of closing effort as a function of tailgate angle. The plot with circular data points, labeled "Double Springs-Effort", illustrates predicted closing effort for the two springs in series as described above. Note that, in both cases, initial effort is between 10 and 20 lbs force. The plot with diamond shaped data points, labeled "Weight of gate @ top" illustrates effort required on the top or-outer edge of the gate to raise the gate without any assist.

The plots above the horizontal axis pertain to forces exerted by the system described herein. The plot with the cross shaped data points shows cable tension. The plot with square data points illustrates spring force, i.e., the tension in the series connected springs described above.

In the preferred embodiment, the support members are detachably connected to the support members of the pickup truck by small brackets 40 or other fittings or the like, held in place by removable and replaceable fasteners such as screws or bolts, and the system does not interfere with removal of the tailgate from the pickup truck after detachment of the support members.

The system is preferably configured so that it does not have any components protruding or visible when the tailgate is closed, When the tailgate is open, its components project only minimally from the tailgate so as to have no adverse impact on clearances or appearance.

The system may be provided as a kit for retrofit installation comprising the tensioning mechanism 12, cables or other supports 22, reinforcing plates 26, and fasteners. In some embodiments, the cables 22 may be preattached. In other embodiments, the cables may be attached as part of the installation process. In either case, the kit is preferably configured to enable installation to be accomplished with a relatively small number of steps.

A typical installation process may comprise removing the original cables from the tailgate and D posts, removing a panel 42 from the inner wall 44 of the tailgate 20, drilling holes for the new cables and reinforcement plates in the end walls 28 of the tailgate, inserting the tensioning mechanism into the interior of the tailgate, installing the reinforcement plates, extending the new cables through the holes, and attaching the cables to the D posts 46.

What is claimed is:

1. An tailgate lift assist system that may be installed without undue difficulty comprising:
    a pair of support members capable of applying upward force to a tailgate; and
    a tensioning mechanism connected to said support members to apply tension thereto;
    said system being configured so that said tensioning mechanism will increase tension in said support members and thereby increase upward force on the tailgate as the tailgate approaches its fully open position;
    said tensioning mechanism being positioned within the tailgate.

2. A tailgate lift assist system in accordance with claim 1 wherein said tensioning mechanism additionally assists in initiating closing of the tailgate.

3. A tailgate lift assist system in accordance with claim 1 wherein said tensioning mechanism comprises a plurality of springs having different spring constants arranged in series.

4. A tailgate lift assist system in accordance with claim 1 wherein said tensioning mechanism transmits tension between said support members to equalize tension in said support members.

5. A tailgate lift assist system in accordance with claim 1 wherein said tensioning mechanism comprises one or more coil springs loaded in tension extending across the tailgate.

6. A tailgate lift assist system in accordance with claim 1 wherein said support members extend into the interior of the tailgate, said system further comprising reinforcing structures mounted on the tailgate to increase the ability of the tailgate to withstand loads and wear associated with said system, and limiters on said support members, each of said limiters comprising a clamp attaching it to one of said support members, and a resilient, energy absorbing bumper to absorb energy upon impact with one of said reinforcing structures.

7. A tailgate lift assist system in accordance with claim 6 wherein said reinforcing structures include rollers for engaging said support members, and wherein each of said bumpers includes an elastomeric material.

8. A tailgate lift assist system in accordance with claim 1 wherein said system applies tension to said support members only through a predetermined range of tailgate angles.

9. A tailgate lift assist system in accordance with claim 1 wherein said system applies tension to said support members at least when the tailgate is at an angle of between 40 and 90 degrees from its closed position.

10. A tailgate lift assist system in accordance with claim 1 wherein said system does not apply significant tension to said support members at least when the tailgate is at an angle of between 0 and 20 degrees from its closed position.

11. A tailgate lift assist system in accordance with claim 1 wherein under static conditions, an upward load of at least 10 lbs. must be applied to the tailgate to initiate upward movement from its fully open position.

12. A tailgate lift assist system in accordance with claim 1 wherein said support members are detachably connected to support members of said pickup truck, and said system does not interfere with removal of the tailgate from the pickup truck after detachment of said support members.

13. A tailgate lift assist system in accordance with claim 1 wherein:
    said tensioning mechanism additionally assists in initiating closing of the tailgate;
    said tensioning mechanism comprises a plurality of springs having different spring constants arranged in series;
    said tensioning mechanism transmits tension between said support members to equalize tension in said support members;
    said tensioning mechanism comprises one or more coil springs loaded in tension extending across the tailgate and a noise-reducing sheath at least partially covering said coil springs;
    said support members extend into the interior of the tailgate, said system further comprising reinforcing structures mounted on the tailgate to increase the ability of the tailgate to withstand loads and wear associated with said system;
    said reinforcing structures include rollers for engaging said support members;
    said system applies tension to said support members only through a predetermined range of tailgate angles;
    said system applies tension to said support members at least when the tailgate is at an angle of between 40 and 90 degrees from its closed position;
    said system does not apply significant tension to said support members at least when the tailgate is at an angle of between 0 and 20 degrees from its closed position; under static conditions, an upward load of at least 10 lbs. must be applied to the tailgate to initiate upward movement from its fully open position;
    said support members are detachably connected to support members of said pickup truck;
    said system does not interfere with removal of the tailgate from the pickup truck after detachment of said support members; and
    said system does not change the appearance of the pickup truck when the tailgate is closed.

14. A method of facilitating opening and closing of a pickup truck tailgate having a pair of supports, comprising applying tension to said supports from within the tailgate, and retracting portions of said supports into the interior of said tailgate as said tailgate is pivoted upward, and decreasing tension on said supports and thereby decreasing upward assist as the tailgate is pivoted upward from its fully open position.

15. A method in accordance with claim 14 further comprising applying increasing tension to said supports as the tailgate approaches its fully open position.

16. A method in accordance with claim 14 wherein applying tension to said supports comprises increasing potential energy of an elastic structure.

17. A method in accordance with claim 14 further comprising engaging said supports with rollers adjacent openings in the tailgate.

18. A method in accordance with claim 14 wherein tension is applied to said support members at least when the tailgate is at an angle of between 40 and 90 degrees from its closed position.

19. A method in accordance with claim 14 wherein tension is not applied to said support members at least when the tailgate is at an angle of between 0 and 20 degrees from its closed position.

20. A method in accordance with claim 14 wherein the maximum tension applied to the tailgate is limited so that under static conditions, an upward load of at least 10 lbs. must be applied to the tailgate to initiate upward movement from its fully open position.

21. A pickup truck comprising a pair of structural posts, a tailgate adjacent said structural posts, and a tailgate lift assist system comprising:

support members connected to said structural posts for applying upward force to said tailgate; and a tensioning mechanism connected to said support members to apply tension thereto;

said system being configured so that said tensioning mechanism will increase tension in said support members and thereby increase upward force on the tailgate as the tailgate approaches its fully open position;

said tensioning mechanism being positioned within the tailgate.

22. A pickup truck tailgate system comprising a pair of structural posts, a tailgate adjacent said structural posts, and a tailgate lift assist system comprising:

a pair of support members capable of applying upward force to a tailgate; and a tensioning mechanism connected to said support members to apply tension thereto;

said system being configured so that said tensioning mechanism will increase tension in said support members and thereby increase upward force on the tailgate as the tailgate approaches its fully open position;

said tensioning mechanism being positioned within the tailgate.

23. A kit for a tailgate lift assist system comprising: a pair of support members capable of applying upward force to said tailgate; and a tensioning mechanism capable of being placed within the tailgate, connected to said support members to apply tension thereto;

said system being configured so that said when installed, said tensioning mechanism will increase tension in said support members and thereby increase upward force on the tailgate as the tailgate approaches its fully open position.

24. The kit of claim 23 wherein said support members comprise a pair of cables, said tensioning mechanism comprises at least one resilient member loaded in tension between said cables, and said system further comprises a pair of reinforcing members for withstanding forces applied to the tailgate by said support members, each reinforcing member comprising a base plate having a pair of aligned mounting openings, and a roller disposed at a non-oblique angle to a line through the centers of said mounting openings.

25. The kit of claim 24 wherein each reinforcing member comprises a V-shaped roller assembly, and each reinforcing member may be used on either end of the tailgate.

26. A method of installing a tailgate lift assist system on a pickup truck having a tailgate located adjacent structural members and connected thereto by support members comprising:

removing a panel from the tailgate;

placing a tensioning mechanism into the interior of the tailgate;

connecting the tensioning mechanism to support members; and connecting said support members to said structural members; and replacing the panel.

27. The method of claim 26 wherein the tensioning mechanism is connected to the support members without tension on the support members.

28. The method of claim 27 wherein the support members are connected to the structural members without tension on the support members.

29. The method of claim further comprising forming openings in the tailgate, installing means for engaging the support members adjacent said openings, and extending said support members through said openings.

30. The method of claim 29 wherein at least one of connecting the tensioning mechanism to support members and connecting said support members to said structural members takes place with tailgate at an angle of less than about 40 degrees from its closed position.

* * * * *